Feb. 2, 1971  B. A. BOLTON  3,560,310
LAMINATING MACHINE
Filed May 20, 1968
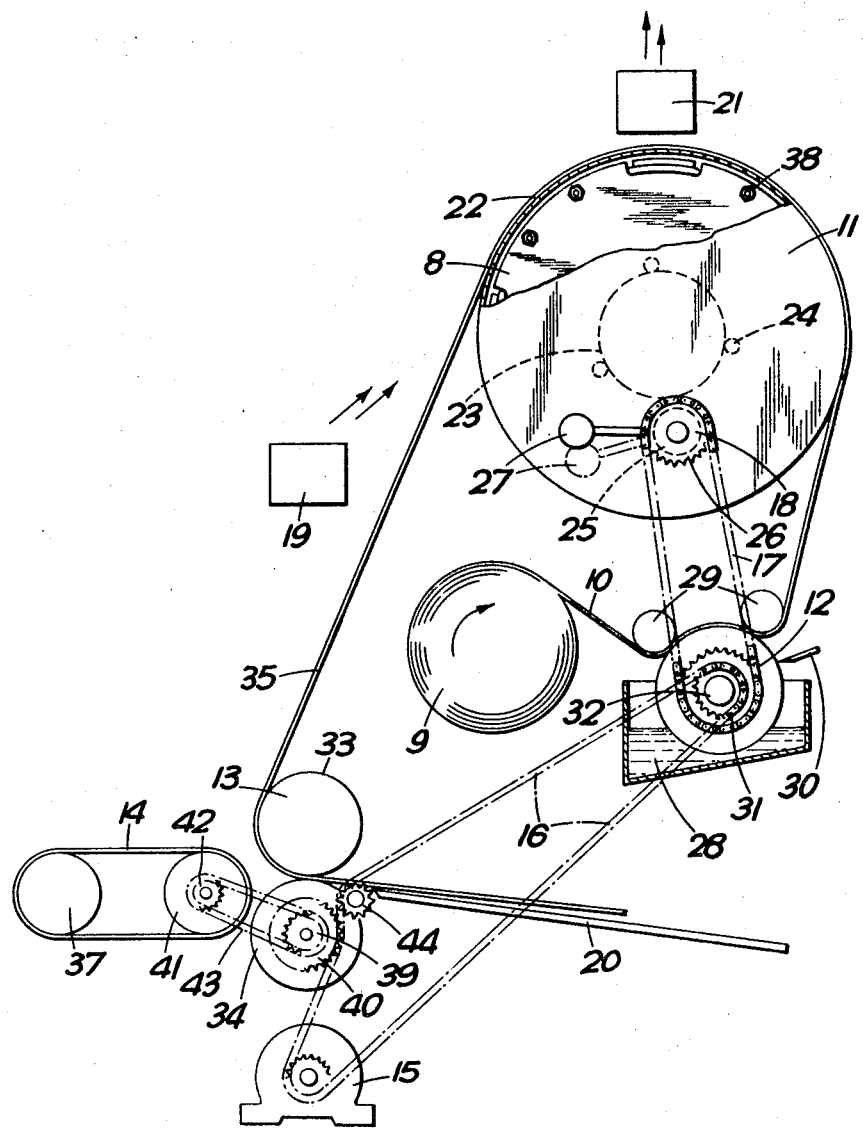

United States Patent Office 3,560,310
Patented Feb. 2, 1971

3,560,310
LAMINATING MACHINE
Brian Albert Bolton, Staines, England, assignor to Morane Plastic Company Limited, Staines, England, a British company
Filed May 20, 1968, Ser. No. 730,244
Claims priority, application Great Britain, May 22, 1967, 23,767/67
Int. Cl. B32b 31/06, 31/12
U.S. Cl. 156—552    7 Claims

ABSTRACT OF THE DISCLOSURE

A machine that coats thermoplastic film from a roll with liquid adhesive, passes the coated film over a heated rotary drum having internal stationary heating rods to dry or partly dry the adhesive, the friction between the film and the drum causing the drum to rotate. Web to be laminated is fed by a conveyor belt to a heated roll press which applies the coated film to the web. There are auxiliary drive means to rotate the drum during a warming up period.

---

The invention relates to laminating machines and more particularly to machines for laminating printed material or the like to thin thermoplastic films.

The invention provides a laminating machine for applying thermoplastic film to printed matter which machine comprises means to mount a roll of film for rotation about its axis, means to apply liquid adhesive to the film, a drum mounted for rotation about an axis parallel to the axis of the roll, one or more stationary heating elements spaced apart around the inner periphery of the drum to heat the drum, means to laminate printed material to the film, means to guide the film in turn from the roll to the adhesive applying means, then around part of the periphery of the drum, to dry or partly dry the adhesive on the film and then to the laminating means, means to drive the film through the guide means so that friction between the film and the drum rotates the drum and drum drive means to rotate the drum and disengageable clutch means to connect the drum drive means to the drum (e.g. to enable the drum to be warmed up before the film is fed onto the drum).

Preferably the drum is rotatable about a horizontal axis and the heating elements comprise rod-like elements parallel to the drum axis and distributed close to the drum surface around the upper half of the drum periphery.

It is also preferred that the clutch means comprises a rotatable friction wheel which is driven by the drive means and there are provided means to bring the wheel into frictional driving engagement with a second wheel attached to one end of the drum.

It is further preferred that the laminating means comprises a pair of rollers, means to move the rollers parallel to one another, means to press the rollers together to form a nip, and means to heat at least one of the rollers forming the nip.

There may be means to drive at least one of the laminating rollers.

In one preferred embodiment there is means to feed the web or printed matter to be laminated to the laminating means which feed means comprises a driven conveyor belt.

In another preferred embodiment the means to apply liquid adhesive to the film comprises an adhesive application roller mounted for rotation about an axis parallel to the drum and means to maintain a supply of adhesive in contact with the roller.

A specific embodiment of a laminating machine according to the invention will now be described with reference to the accompanying diagrammatic drawing which is a side view of the laminating machine.

As may be seen from the drawing in a film laminating machine there is a roll 9 of film 10 supported with its axis horizontal by suitable support means, an adhesive application roller 12 for coating the film with adhesive, a heated drum 11 over which the film is guided to dry or partly dry the film, a roll press or nip 13 for pressing the adhesive coated film to printed matter or a web to be laminated and a conveyor belt 14 for feeding the printed matter or web to the roll press. A guide 20 receives articles after lamination and delivers them to a suitable exit from the laminating machine.

The film extends from the film roll over the adhesive application roller and the heated drum to the roll press.

A hot air blower 19 blows air onto the film to aid the drying of the film while an exhaust fan 21 extracts fumes and water vapour formed during the laminating process.

The adhesive application roller 12 is rotatably mounted on the machine frame with its axis of rotation horizontal. A bath 28 containing adhesive is mounted adjacent the roller 12 so that a segment of the roller is immersed in the adhesive. Two smaller guide rollers 29 are mounted on the machine frame close to and parallel with the roller 12 in order to hold film against the upper part of the roller. An adhesive doctor blade 30 is mounted parallel to the roller 12 to regulate the amount of adhesive on the roller.

The heated drum 11 comprises a hollow cylindrical aluminium skin 22. There is an axial driving hub or wheel 23 attached to the discs 8 mounted with its axis horizontal for rotation about that axis by means of three paraxial rollers 24 located at equal intervals around the hub. These rollers are mounted for angular rotation in a vertical plane.

A plurality of electrical heating elements 38 are arranged to lie close to and spaced at equal intervals around the inside surface of the portion of skin for the time being uppermost. The elements are attached to stationary plates 8 one at each end of the drum and the elements remain stationary while the drum rotates.

The roll press 13 comprises two pressure rollers 33 and 34 mounted paraxially in a vertical plane. The upper roller contains oil heated electrically to aid the drying of the adhesive. The lower roller has two drive sprocket wheels 39 and 40 mounted axially on one end and fixedly connected together.

The conveyor belt 14 comprises a band passing round two rollers 37 and 41. Roller 41 has a drive sprocket wheel 42 mounted axially at one end.

A motor 15 drives the adhesive application roller, the conveyor belt and the roll press, while the heated drum may be rotated when required (e.g. during a warming up period) by engaging a friction clutch 18.

The adhesive application roller is provided with two sprocket wheels 32 and 31. The sprocket wheel 32 connects the roller with the motor 15 via a chain drive 16 while the sprocket wheel 31 connects the roller and hence the motor with a sprocket wheel 26 mounted on the friction clutch.

An idler sprocket wheel 44 is provided as a guide for the chain drive 16.

The friction clutch 18 comprises a small rubber covered friction wheel or roller 25 mounted at one end of a spindle while the other end of the spindle is connected to the centre of the sprocket wheel 26. The spindle is eccentrically mounted in a cylindrical casing to which an actuating lever 27 is fixed so that on turning the lever through an angle the casing is rotated about its longitudinal axis causing the spindle to be moved through a small angle to bring the drive wheel or roller into contact with the drive hub 23 on the drum.

The nip is driven by the motor 15 via chain drive 16 which connects with sprocket wheel 40 and the conveyor belt is driven via chain drive 43 which connects sprocket wheel 42 to sprocket wheel 39, the latter wheel being fixedly connected to sprocket wheel 40 and hence powered by the motor 15 via chain drive 16.

In operation the machine is allowed to warm up prior to the application of adhesive onto the film and to actual lamination.

To achieve this the exhaust and inlet fans are switched on, electrical power is supplied to the elements in the heated drum and also to the heated nip roller. The motor 15 is switched on and the friction clutch is engaged.

The adhesive roller is rotated in an anti-clockwise direction (as viewed in the diagram) the friction clutch is engaged driving the heated drum in a clockwise direction.

When the heated nip roller and large heated drum have reached their desired temperature the electrical supply to the large heated drum is switched off, the clutch is disengaged, and the film to be used is laced through the machine as shown.

The film is fed between the nip rollers and this causes the film to move through the machine in the direction indicated by the arrow and thus rotate the large heated drum in an anti-clockwise direction by friction. The adhesive application roller rotates in an anti-clockwise direction tending to oppose the passage of the film.

The electrical supply is then re-connected to the heating elements in the large heated drum, adhesive applied to the film, and the web or printed matter is fed by the conveyor belt to the nip and lamination commences.

I claim:
1. A laminating machine for applying thermoplastic film to printed matter comprising:
  (a) means to mount a roll of film for rotation about its axis,
  (b) means to apply liquid adhesive to the film,
  (c) a hollow heating drum,
  (d) means to mount the drum freely for rotation about an axis parallel to the axis of the roll,
  (e) a plurality of stationary heating elements mounted within the drum spaced apart around the inner periphery of the drum to heat the drum,
  (f) means to laminate printed material to the film,
  (g) means to guide the film in turn from the roll to the adhesive applying means then around part of the periphery of the drum to dry or partly dry the adhesive on the film and then to the laminating means,
  (h) means to drive the film through the guide means so that friction between the film and the drum rotates the drum,
  (i) a first friction wheel attached to one end of the drum,
  (j) drum drive means to rotate the drum,
  (k) disengageable clutch means to connect the drum drive means to the drum to rotate the drum allowing the drum to be warmed up before the film is fed into the drum comprising a second rotatable friction wheel driven by the drive means and means to bring the second wheel into frictional driving engagement with the first wheel.
2. A laminating means as claimed in claim 1 in which the drum is rotatable about an horizontal axis and the heating elements comprise rod-like elements parallel to the drum axis and distributed close to the drum surface around the upper half of the drum periphery.
3. A laminating machine as claimed in claim 1 in which the laminating means comprises:
  (a) a pair of rollers,
  (b) means to move the rollers parallel to one another,
  (c) means to press the rollers together to form a nip, and
  (d) means to heat at least one of the rollers forming the nip.
4. A laminating machine as claimed in claim 3 in which there is means to drive at least one of the laminating rollers.
5. A laminating machine as claimed in claim 1 in which there is means to feed the web or printed matter to be laminated to the laminating means which feed means comprises a driven conveyor belt.
6. A laminating machine as claimed in claim 1 in which the means to apply liquid adhesive to the film comprising an adhesive application roller mounted for rotation about an axis parallel to the drum and means to maintain a supply of adhesive in contact with the roller.
7. A laminating machine for applying thermoplastic film to printed matter comprising:
  (a) means to mount a roll of film for rotation about its axis,
  (b) an adhesive application roller mounted for rotation about a horizontal axis to apply liquid adhesive to film fed from the roll,
  (c) means to maintain a supply of adhesive in contact with the adhesive application roller,
  (d) a hollow heating drum,
  (e) means to mount the drum for rotation about a horizontal axis,
  (f) a plurality of stationary rod-like heating elements mounted in the drum parallel to the drum axis and distributed close to the drum surface around the upper half of the drum periphery to heat the drum,
  (g) means to laminate printed material to the film comprising:
    (i) a pair of rollers,
    (ii) means to mount the rollers parallel to one another,
    (iii) means to press the rollers together to form a nip, and
    (iv) means to heat at least one of the rollers forming the nip, and
    (v) means to drive at least one of the laminating rollers to drive the film through the guide means so that the friction between the film and the drum rotates the drum,
  (h) means to guide the film in turn from the roll to the adhesive applying means, then around part of the periphery of the drum to dry or partly dry the adhesive on the film and then to the laminating means,
  (i) drum drive means to rotate initially the drum until the drum becomes heated,
  (j) disengageable clutch means to connect the drum drive means to the drum to rotate initially the drum allowing the drum to be warmed up before the film is fed into the drum which clutch means comprises:
    (i) a rotatable friction wheel arranged to be driven by the drive means, and
    (ii) means to bring the wheel into frictional driving engagement with a second wheel attached to one end of the drum,
  (k) means to feed the web or printed matter to be laminated to the laminating means which feed means comprises a driven conveyor belt.

References Cited
UNITED STATES PATENTS
| | | | |
|---|---|---|---|
| 2,378,599 | 6/1945 | Thornton | 118—60 |
| 2,844,174 | 7/1958 | Ware et al. | 156—552 X |
| 2,964,958 | 12/1960 | Morrison et al. | 74—199 |
| 3,089,460 | 5/1963 | Mahoney et al. | 118—60 |
| 3,276,938 | 10/1966 | Malewski | 156—555 X |

BENJAMIN A. BORCHELT, Primary Examiner

J. M. HANLEY, Assistant Examiner

U.S. Cl. X.R.

156—547, 555, 578